(12) United States Patent
van Riel et al.

(10) Patent No.: US 9,715,403 B2
(45) Date of Patent: Jul. 25, 2017

(54) OPTIMIZED EXTENDED CONTEXT MANAGEMENT FOR VIRTUAL MACHINES

(71) Applicant: Red Hat, Inc., Raleigh, NC (US)

(72) Inventors: Henri van Riel, Merrimack, NH (US); Marcelo Tosatti, Porto Alegre (BR)

(73) Assignee: Red Hat, Inc., Raleigh, NC (US)

( * ) Notice: Subject to any disclaimer, the term of this patent is extended or adjusted under 35 U.S.C. 154(b) by 89 days.

(21) Appl. No.: 14/634,164

(22) Filed: Feb. 27, 2015

(65) Prior Publication Data
US 2016/0253196 A1    Sep. 1, 2016

(51) Int. Cl.
| G06F 9/46 | (2006.01) |
| G06F 9/48 | (2006.01) |
| G06F 9/455 | (2006.01) |
| G06F 9/50 | (2006.01) |

(52) U.S. Cl.
CPC ......... *G06F 9/45558* (2013.01); *G06F 9/461* (2013.01); *G06F 9/4812* (2013.01); *G06F 9/5016* (2013.01); G06F 2009/45575 (2013.01)

(58) Field of Classification Search
CPC ..... G06F 9/45558; G06F 9/461; G06F 9/5016
See application file for complete search history.

(56) References Cited

U.S. PATENT DOCUMENTS

| 6,496,847 B1* | 12/2002 | Bugnion | G06F 9/45533 703/21 |
| 6,766,515 B1* | 7/2004 | Bitar | G06F 9/4843 712/228 |
| 8,296,775 B2 | 10/2012 | Thornton et al. | |
| 8,402,441 B2 | 3/2013 | Budko et al. | |
| 8,832,688 B2 | 9/2014 | Tang et al. | |
| 2008/0183944 A1* | 7/2008 | Thornton | G06F 9/461 711/6 |
| 2010/0299665 A1 | 11/2010 | Adams | |
| 2011/0153909 A1 | 6/2011 | Dong | |
| 2012/0084487 A1 | 4/2012 | Barde | |
| 2013/0263124 A1 | 10/2013 | Patel et al. | |
| 2014/0006758 A1 | 1/2014 | Rotem et al. | |

OTHER PUBLICATIONS

Rachamalla, "Kernel Virtual Machine", Indian Institute of Technology, Department of Computer Science, Nov. 24, 2011 (11 pages).
van Riel, "KVM vs. Messasge Passing Throughout", Reducing Context Switching Overhead, KVM Forum 2013 (28 pages).

* cited by examiner

*Primary Examiner* — Meng An
*Assistant Examiner* — Jorge A Chu Joy-Davila
(74) *Attorney, Agent, or Firm* — K&L Gates LLP (57) ABSTRACT

Optimized extended context management for virtual machines is disclosed. An example system includes a memory, processor, VM, and kernel, which executes the VM using guest space, stores a guest state in an extended state register, which the VM has access to, receives an instruction, saves the guest state, and determines whether the kernel is configured to handle the process using kernel space. If so, the process is handled using kernel space without using user space, and if not, a user state in the extended state register is restored, the process is handled using user space, an updated user state is stored in the extended state register, the updated user state is saved, and the guest state is restored in the extended state register. Finally, execution of the VM using the guest space is resumed.

20 Claims, 5 Drawing Sheets

OPTIMIZED EXTENDED CONTEXT MANAGEMENT FOR VIRTUAL MACHINES

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may typically involve a virtual machine executing for intermittent periods of time on one or more physical processors, for example, based on scheduled time slots, interrupts, migrating from one physical processor to another, or the like. Virtual machines may have one or more context states while executing, which may need to be maintained when the execution is interrupted, paused, or halted for any one of a variety of reasons. Thus, virtualization typically includes managing an extended context state for virtual machines.

SUMMARY

The present disclosure provides a new and innovative system, methods and apparatus for optimized extended context management for virtual machines. In an example embodiment, a system includes a memory, a processor, a virtual machine, and a kernel, which executes the virtual machine using a guest space, stores a guest state in an extended state register based on the execution of the virtual machine, where the virtual machine has access to the extended state register, receives a instruction for handling a process outside of the guest space, saves a copy of the guest state in a reserve memory outside the extended state register, and determines whether the kernel is configured to handle the process using a kernel space. If the kernel is configured to handle the process using the kernel space, then the process is handled using the kernel space without using a user space and execution of the virtual machine using the guest space is resumed. If the kernel is not configured to handle the process using the kernel space a user state in the extended state register is restored, the process is handled using the user space, an updated user state is stored in the extended state register, a copy of the updated user state is saved in the reserve memory outside the extended state register, the guest state is restored in the extended state register, and execution of the virtual machine using the guest space is resumed.

Additional features and advantages of the disclosed method and apparatus are described in, and will be apparent from, the following Detailed Description and the Figures.

DETAILED DESCRIPTION OF EXAMPLE EMBODIMENTS

Figure 1:
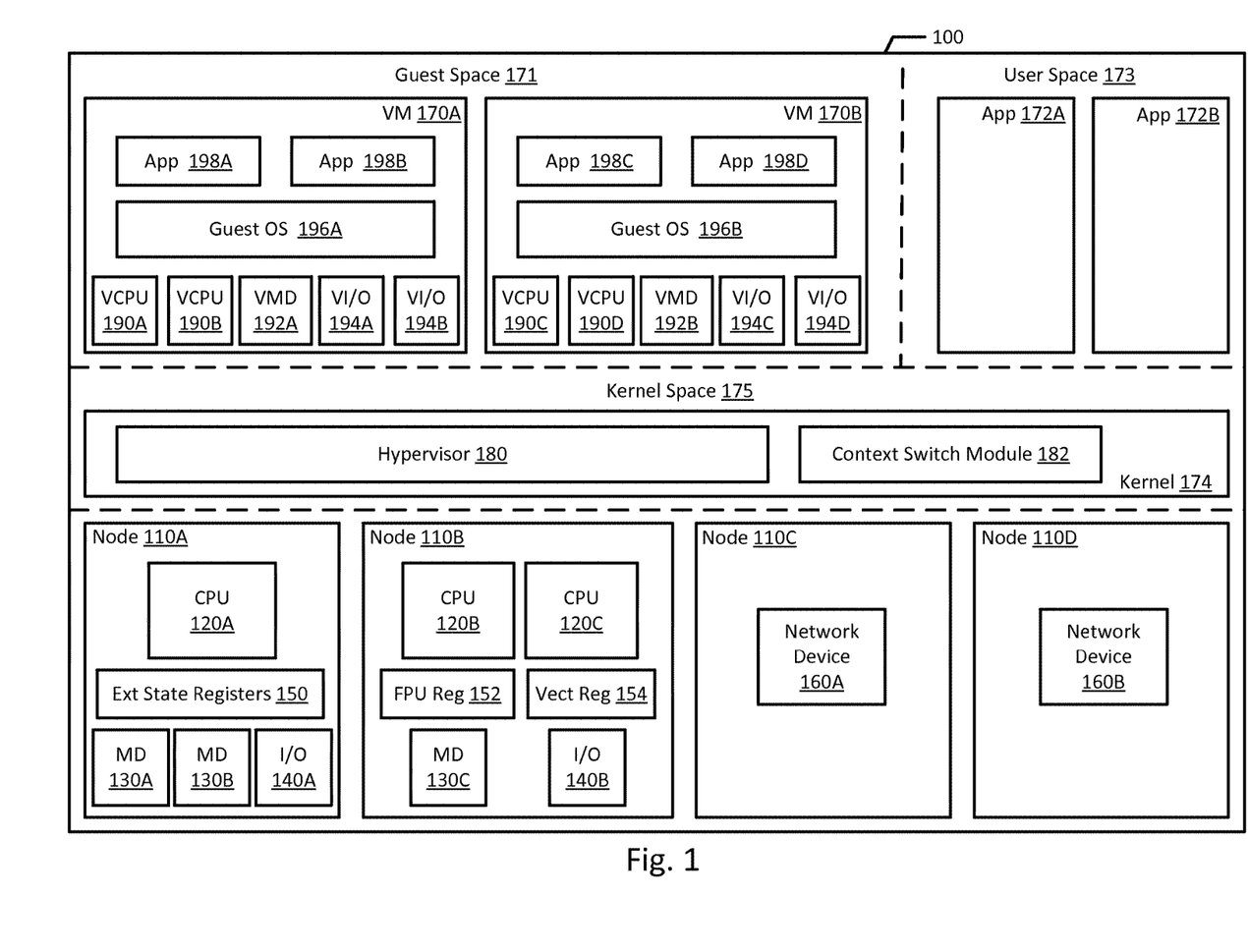
FIG. 1 is a block diagram of an example host computer system, according to an example embodiment of the present disclosure.

FIG. 1 depicts a block diagram of an example host computer system 100 according to an example embodiment of the present disclosure. The host computer system 100 as described herein may also be referred to as a host machine 100, or simply a host 100. The example host 100 may be a multi-processor machine, which may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each CPU 120A-C may include one or more extended state registers, which store a current context state for an executing process, as described in greater detail below. For example, CPU 120A includes an extended state register 150. Node 110B includes a floating point unit register 152 (FPU register) and a vector register 154. The FPU register 152 and the vector register 154 both store a particular context state, the FPU context and the vector context, respectively. Accordingly, the FPU register 152 and the vector register 154 are each an example embodiment of an extended state register 150. The illustrated extended state register 150 may store one or more types of context states in one or more particular registers (e.g., FPU register 152, vector register 154).

Each node 110C-D may include a networking device 160A-B. In an example embodiment, a network device 160A-B may be a network interface controller (NIC), a network adapter, or any other component that connects a computer to a computer network.

As used herein, a CPU 120A-C refers to a physical processor capable of executing instructions encoding arithmetic, logical, and/or I/O operations. In one illustrative example, a processor may follow Von Neumann architectural model and may include an arithmetic logic unit (ALU), a control unit, and a plurality of different registers (e.g., data registers, address registers, general purpose registers, conditional registers, FPU registers, constant registers, vector registers, special purpose registers, etc.). In an example embodiment, a CPU 120A-C may be a single core processor which is typically capable of executing one instruction at a time (or process a single pipeline of instructions), or a multi-core processor which may simultaneously execute multiple instructions. A processor may be implemented as a single integrated circuit, two or more integrated circuits, or may be a component of a multi-chip module (e.g., in which individual microprocessor dies are included in a single integrated circuit package and hence share a single socket).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

The CPUs 120A-C may be interconnected using a variety of techniques, ranging from a point-to-point processor interconnect, to a system area network, such as an Ethernet-based network. Local connections within each node 110A-D, including the connections between a CPU 120A and a memory device 130A-B and between a CPU 120A and an I/O device 140A may be provided by one or more local buses of suitable architecture, for example, peripheral component interconnect (PCI). Dedicated connections between the CPU 120A and the extended state registers 150 and between the CPU 120B-C and FPU register 152 and vector register 154 provide fast access to data stored within the registers 150, 152, 154, for the respective CPUs 120A-C.

The host computer system 100 may run one or more applications and/or virtual machines. For example, the host 100 executes a kernel 174, which is a software layer above the hardware layer including nodes 110A-D, as schematically shown in FIG. 1. Specifically, for example, the kernel 174 operates using kernel space 175, which includes memory (e.g., MD 130A-C) dedicated for use by the kernel 174, and executing on the kernel is a hypervisor 180 and context switch module 182. One or more virtual machines 170A-B (VM 170A-B) may execute on the kernel 174 under management of the hypervisor 180, which may also be referred to as a virtual machine monitor or VMM. Also, one or more applications 172A-B may execute outside of any virtual machine 170A-B on the kernel 174. The virtual machines 170A-B operate in guest space 171 and the applications 172A-B operate in user space 173. In an example embodiment, the kernel 174 may be a Linux kernel and the hypervisor 180 may be an implementation of KVM (kernel-based virtual machine). In another example embodiment, the hypervisor 180 may be provided by an application running on any operating system, or may run directly on the host computer system 100 without any operating system beneath it. The kernel 174 and hypervisor 180 may operate together to virtualize the physical layer, including processors, memory, and I/O devices, and present this virtualization to virtual machines 170A-B as virtual devices, including virtual processors (e.g., VCPU 190A-D), virtual memory (e.g., VMD 192-B), and/or virtual I/O devices (e.g., VI/O 194A-D).

In an example embodiment, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B on the guest operating system 196A-B. In an example embodiment, a virtual machine 170A-B may include multiple virtual processors (VCPU) 190A-D. A virtual machine 170A-B may be different from the illustrated example, and may be any type of virtual device, virtual appliance, or the like. For example, a virtual device may provide the functionality of traditional hardware devices such as network devices, storage devices, sound or video adaptors, photo/video cameras, printer devices, keyboards, displays, etc. Processor virtualization may be implemented with the hypervisor 180 scheduling time slots on one or more physical processors 120A-C such that from the guest operating system's perspective those time slots are scheduled on a virtual processor 190A-D. Also, applications 172A-B may operate concurrently with virtual machines 170A-B. Typically, a task or process operating on a virtual machine 170A-B may need to switch out of the virtual machine 170A-B, thus crossing a privilege boundary, for example, to operate on an application 172A-B, which may be called to complete a specific function. Also, when a virtual machine 170A-B completes a task, the kernel may perform a context switch for a new task. In such cases, the context switch module 182 operating in the kernel 174 manages privilege boundaries and the context switch, which may generally be referred to herein as extended context management. Extended context management may include storing in a reserve memory the extended context state of the virtual machine 170A-B, and restoring an extended context state of the application 172A-B. The reserve memory may be any suitable memory (e.g., MD 130A) outside the registers (e.g., extended state register 150, FPU register 152, vector register 154). In an example embodiment, an FPU register 152 may include 384 bytes or 512 bytes for storage of the floating point unit context state of a virtual machine 170A operating in guest space 171 (e.g., guest FPU state), or the floating point unit context state of the application 172A operating in user space 173 (e.g., user FPU state).

Figure 2:
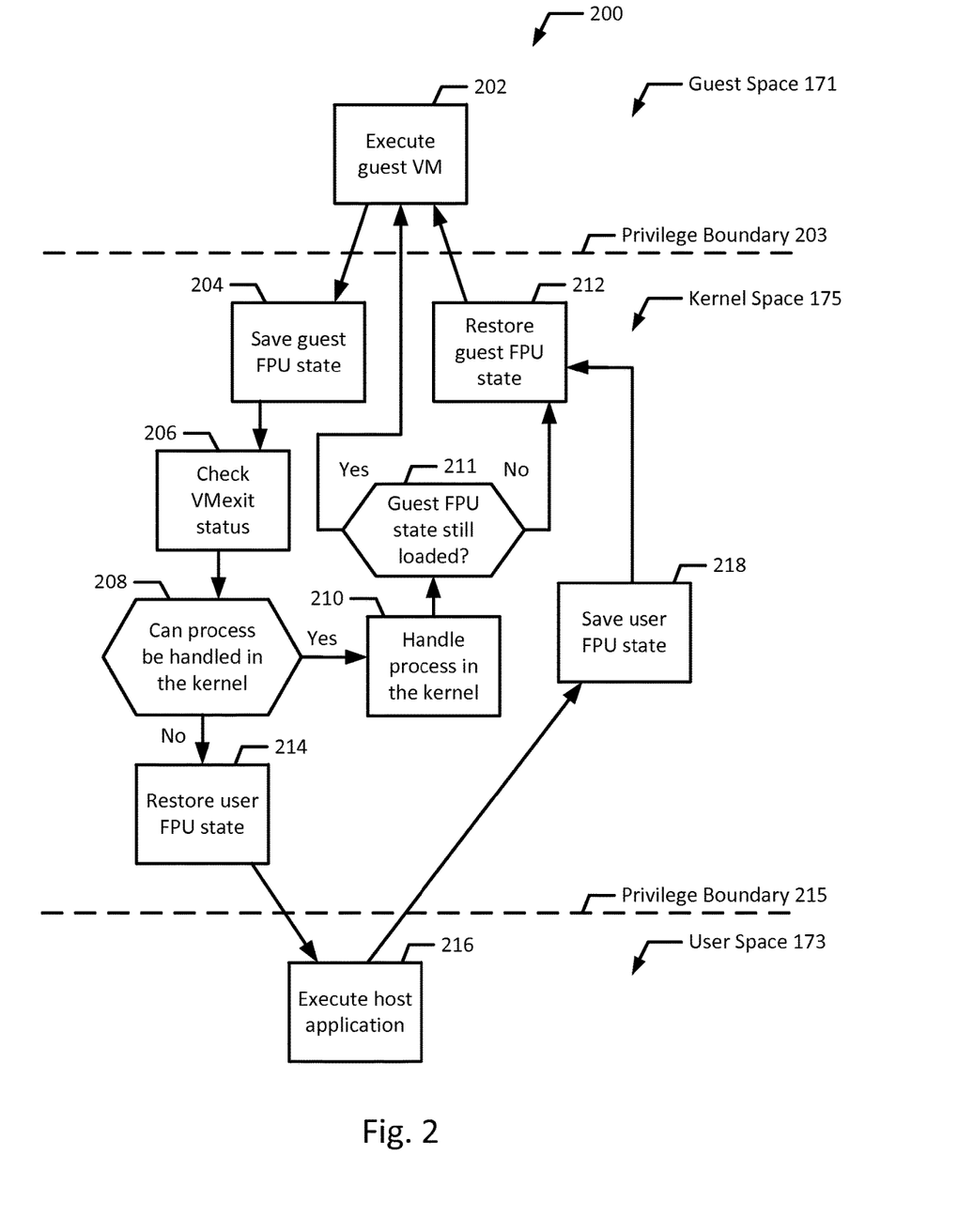
FIG. 2 is flow diagram illustrating an example process for optimized extended context management for virtual machines, according to an example embodiment of the present disclosure.

FIG. 2 is flow diagram illustrating an example process for optimized extended context management for virtual machines, according to an example embodiment of the present disclosure. Although the example process 200 is described with reference to the flow diagram illustrated in FIG. 2, it will be appreciated that many other methods of performing the acts associated with the process 200 may be used. For example, the order of some of the blocks may be changed, certain blocks may be combined with other blocks, and some of the blocks described are optional.

In the example process 200, the process may flow between the guest space 171, the kernel space 175, and the user space 173. The example process 200 may begin with a guest VM executing in guest space 171 (block 202). For example, a guest VM 170A may be operating for some period of time, at which time, the floating point unit register 152 may be storing a context for floating point operations occurring in a CPU 120A. At this time, crossing a privilege boundary 203 may be required, in which the process moves from guest space 171 to kernel space 175. The privilege boundary 203 represents a boundary between guest space 171 and kernel space 175. In an example embodiment, a guest VM 170A may be subjected to switching over a privilege boundary 203 hundreds of times per second. At the time of crossing the privilege boundary 203 into kernel space 175, the guest FPU state is saved (block 204). For example, a reserve memory for any extended state registers 150, 152, 154 may be included in a portion of a memory device 130A, and the context switching module 182 may cause the guest FPU state to be saved in the reserve memory. Next, a VMexit status may be checked (block 206). Responsive to checking the VMexit status, it is determined whether the process can be handled in the kernel 174 (block 208). For example, the context switching module 182 may determine whether the process can be emulated in the kernel 174 without having to switch into user space 173.

If the process can be handled in the kernel 174, then the process will stay in kernel space 175 and be handled in the kernel 174 (block 210). For example, an interrupt process may be handled in kernel space 175 without having to switch into user space 173. After the process is handled in the kernel 174, it is determined if the guest FPU is still loaded (block 211). If the guest FPU is not still loaded, then the guest FPU state is restored (block 212). For example, the guest FPU may be overwritten by the kernel 174 while handling the process and using the FPU register 152. After the guest FPU state is restored, the process may switch over the privilege boundary 203 from kernel space 175 back to guest space 171, and the guest VM 170A may continue executing (block 202). On the other hand at block 211, if it is determined that the guest FPU is still loaded, then the process may switch over the privilege boundary 203 from kernel space 175 back to guest space 171, and the guest VM 170A may continue executing (block 202). For example, the kernel 174 may handle the process without overwriting the FPU register 152. Also, for example, even if the kernel 174 does overwrite the FPU register 152, the kernel 174 may always require explicit access to the FPU register 152, and thus, may allow for always restoring the existing FPU state (e.g., guest FPU state, user FPU state) into the FPU register 152 after using the FPU register 152. Thus, because the process was handled in the kernel 174, the FPU register 152 may maintain the guest FPU state, so it may be unnecessary to overwrite the FPU register 152 with the saved guest FPU state stored in the reserve memory.

With respect to block 208, if the process cannot be handled in the kernel 174, then the user FPU state is restored (block 214). For example, the FPU register 152 which was storing the guest FPU state is overwritten with user FPU state, which was retrieved from the reserve memory. The user FPU state is based on a previous operating state of an application 172A, previously stored in the FPU register 152, and representing the context for floating point operations occurring in a CPU 120A at that time. In an example embodiment, the user FPU state and the guest FPU state may be stored in a single area of memory or may be stored in different locations in memory. At this time, a privilege boundary 215 may be crossed, moving the process from kernel space 175 to user space 173. The privilege boundary 215 represents a boundary between kernel space 175 and user space 173. After the switching over the privilege boundary 215, a host application executes in user space 173 (block 216). For example, application 172A may execute in user space 173, on the CPU 120A, to complete a process not emulated in the kernel 174. During the execution of the application 172A, a user FPU state may be updated during floating point operations occurring the CPU 120A, by updating the user FPU state stored in the FPU register 152.

After the host application 172A has completed executing in user space 173, the privilege boundary 215 may be crossed, moving the process from user space 172 back to kernel space 175, and the user FPU state may be saved (block 218). For example, the host application 172A has been operating for some period of time, and at the time of switching over the privilege boundary 215, the floating point unit register 152 may be storing the updated user FPU state based on floating point operations occurring in the CPU 120A. The user FPU state may then be stored to the reserve memory (e.g., memory device 130A). After a copy of the updated FPU state has been stored in the reserve memory, the guest FPU state is restored (block 212). In an example embodiment, the guest FPU state may be restored by overwriting the user FPU state stored in the FPU register 152 with the previously saved guest FPU state stored in the reserve memory. After the guest FPU state is restored, the process may switch over the privilege boundary 203 from kernel space 175 back to guest space 171, and the guest VM 170A may continue executing (block 202).

Thus, as described above, the restoring of the user FPU state is advantageously delayed until it is determined that switching over privilege boundary 215 must occur, when the process cannot be handled in the kernel 174. Accordingly, the extended state registers 150, FPU register 152, and/or vector register 154 are not automatically overwritten as a result of switching over privilege boundary 203. Therefore, the efficiency of the host computer system 100 may be significantly improved because, for example, a guest VM 170A may be subjected to hundreds of switches over privilege boundary 203 per second, resulting in a savings of, for example, 200 microseconds of execution time for the guest VM 170A over a time period of 1 second.

Figure 3A:
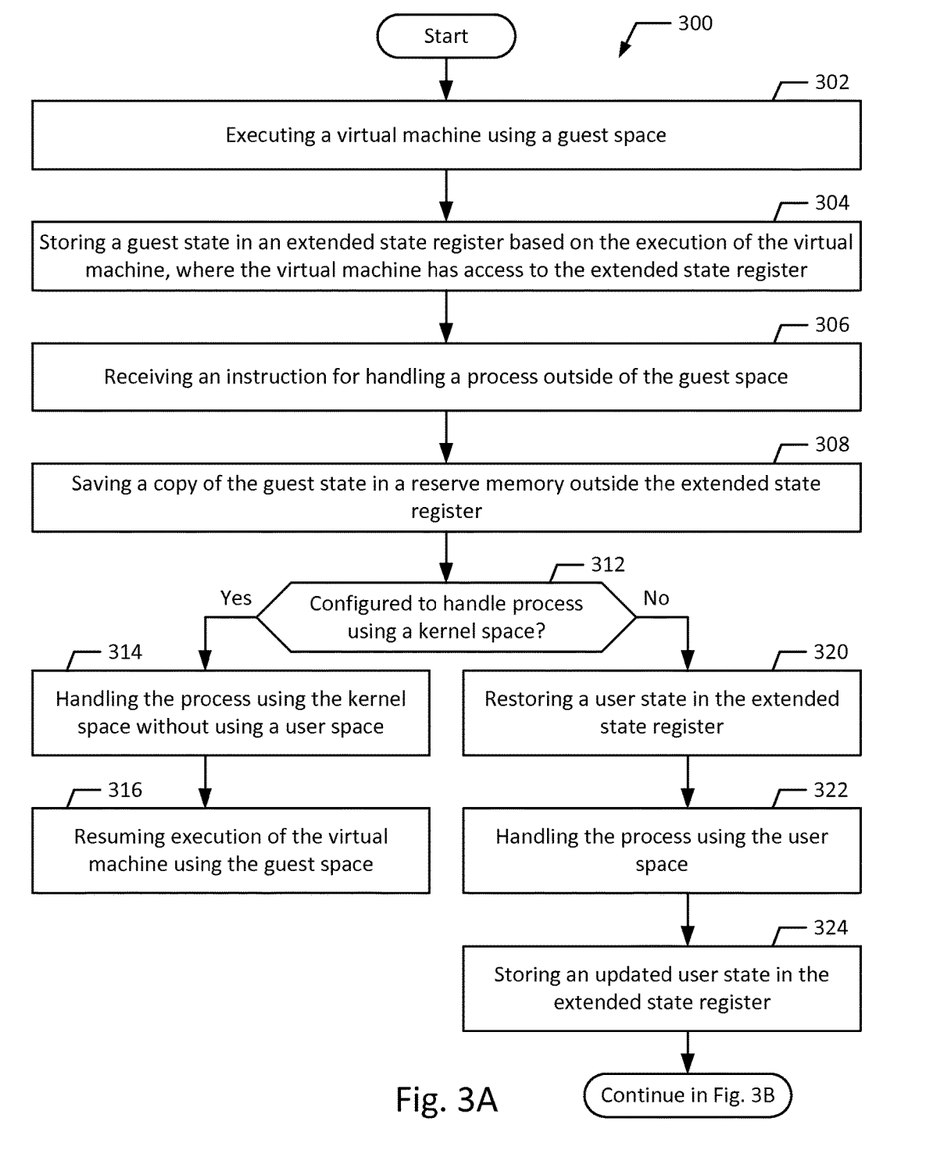
FIGS. 3A and 3B provide a flowchart illustrating an example process for optimized extended context management for virtual machines, according to an example embodiment of the present disclosure.
Figure 3B:
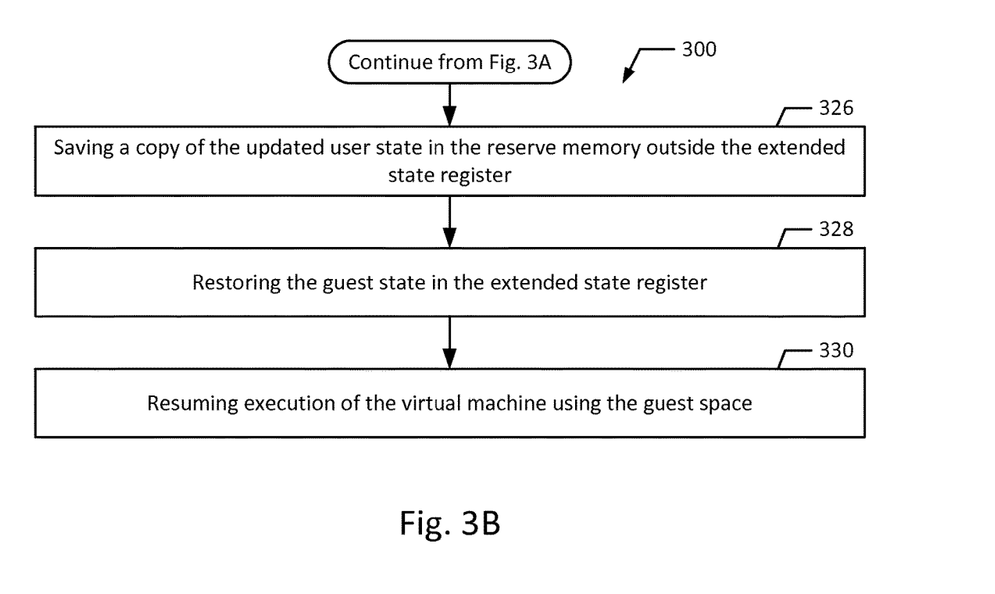

FIGS. 3A and 3B illustrate a flowchart of an example method 300 for optimized extended context management for virtual machines. Although the example method 300 is described with reference to the flowchart illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional.

The example process 300 may begin with executing a virtual machine using a guest space (block 302). For example, a VM 170B is operating in guest space 171. A guest state is stored in an extended state register based on the execution of the virtual machine, where the virtual machine has access to the extended state register (block 304). For example, the VM 170B may be using a FPU register 152 and a vector register 154, and thus, the VM 170B has a current guest FPU state and a current guest vector state. An instruction for handling a process outside of the guest space is received (block 306). For example, an interrupt may be sent from a VCPU 190C to a VCPU 190D. Also, for example, the VM 170B may attempt to access vector register 154 prior to receiving access to vector register 154. In an example embodiment, a VMexit instruction is received which requires a switching over a privilege boundary 203. A copy of the guest state is saved in a reserve memory outside the extended state register (block 308). For example, immediately upon receiving the instruction, a copy of the guest FPU state and guest vector state is saved in a memory device 130 (e.g., RAM). Then, it is determined whether the kernel is configured to handle the process using a kernel space (block 312). For example, it may be determined whether the process can be emulated in the kernel 174 without having to switch into user space 173. If the kernel is configured to handle the process using the kernel space, then the process is handled using the kernel space without using a user space (block 314). For example, the kernel 174 executes the process solely in the kernel space 175. After handling the process using the kernel space, execution of the virtual machine using the guest space is resumed (block 316). For example, the VM 170B continues operating in guest space 171 where it left off prior to receiving an instruction (e.g., an interrupt).

If the kernel is not configured to handle the process using the kernel space, then a user state is restored in the extended state register (block 320). For example, if the kernel 174 requires the use of an application 172B in user space 173, a user FPU state and a user vector state are restored on the FPU register 152 and the vector register 154, respectively. The process is handled using the user space (block 322). For example, the application 172B is executed in user space 173. An updated user state is stored in the extended state register (block 324). For example, the application 172B may be currently using and updating the FPU register 152 and the vector register 154, and thus, the application 172B has an updated user FPU state and an updated user vector state. A copy of the updated user state is saved in the reserve memory outside the extended state register (block 326). For example, when a switch over a privilege boundary 215 occurs, a copy of the user FPU state and user vector state is saved in a memory device 130 (e.g., RAM). After handling the process using the user space and saving the copy of the updated user state, the guest state is restored in the extended state register (block 328). For example, the user FPU state stored in the FPU register 152 and the user vector state stored in the vector register 154 are overwritten by the guest FPU state and the guest vector state stored in the reserve memory. After restoring the guest state in the extended state register, execution of the virtual machine is resumed using the guest space (block 330). For example, the VM 170B continues operating in guest space 171 where it left off prior to receiving an instruction (e.g., an interrupt).

Figure 4:
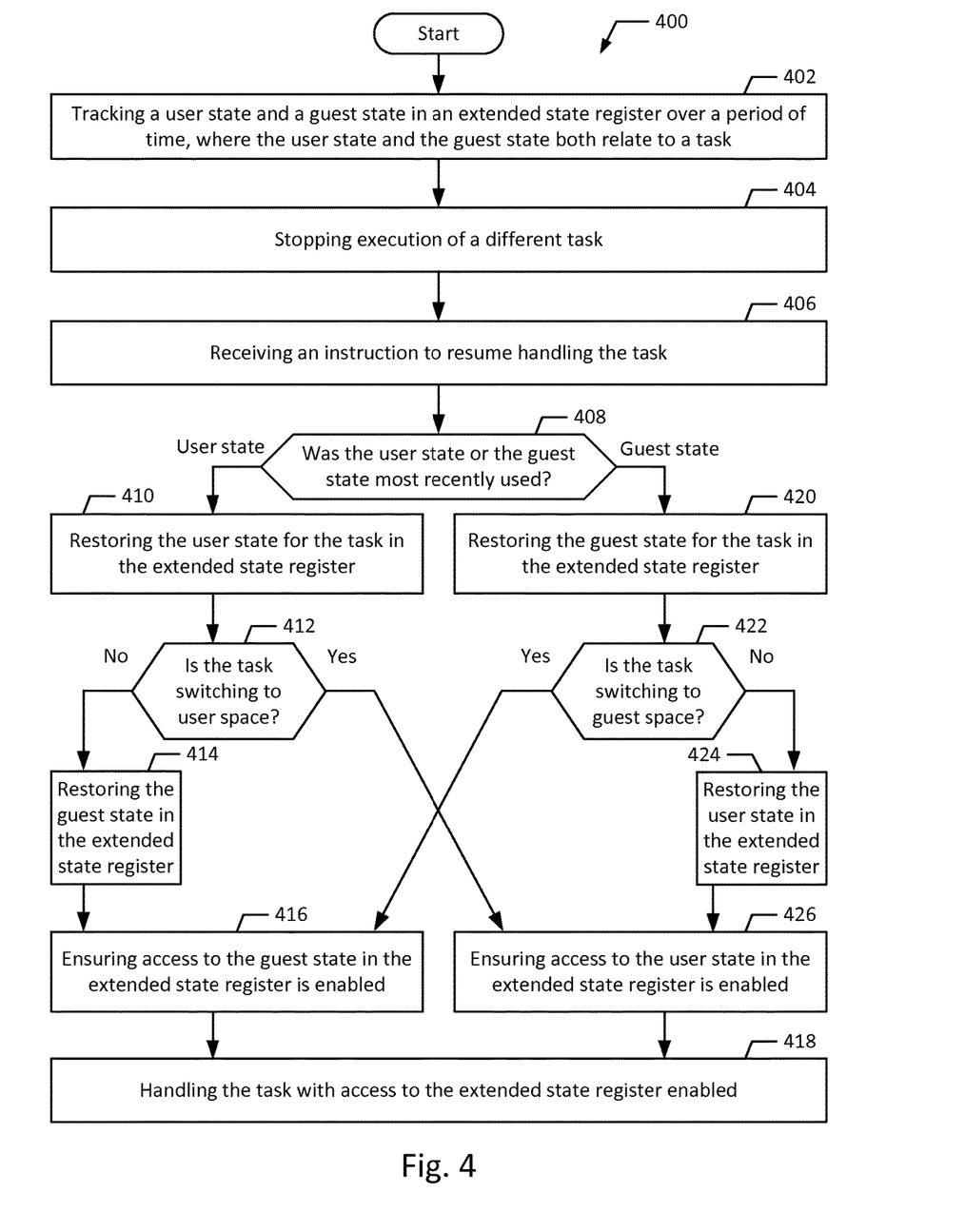
FIG. 4 is a flowchart illustrating an example process for optimized extended context management for virtual machines, according to an example embodiment of the present disclosure.

FIG. 4 illustrates a flowchart of an example method 400 for optimized extended context management for virtual machines. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional.

The example process 400 provides a method for context switching, and may begin with tracking a user state and a guest state in an extended state register over a period of time, where the user state and the guest state both relate to a task (block 402). For example, the reserve memory may keep a log of accesses and/or updates to the extended state register for each task handled by each VCPU 190A-D. Execution of a different task is stopped (block 404). For example, a different task may be completed and stop. Also, for example, the different task may be idle or be paused. An instruction to resume handling the task is received (block 406). For example, the task may be scheduled to be handled once the different task is completed. It is determined which one of the user state of the task and the guest state of the task was most recently used (block 408). For example, the kernel 174 checks the log of accesses/updates to the extended state register to determine, for this task, whether the user state or guest state was most recently used. In another example embodiment, a score may be determined for predicting whether the guest state or the user state will be used next. Accordingly, for example, if the user state was most recently used, but the user state is only used 5% of the time, then a score for the guest state may be higher than a score for the user state.

If the user state was most recently used, the user state for the task is restored in the extended state register (block 410). For example, the user vector state of the task stored in the memory 130A overwrites a guest vector state or a user vector state of the different task stored in the vector register 154. Then, it is determined whether the task that is now being handled is switching to user space (block 412). For example, the kernel 174 determines whether the task will be handled in user space 173 or guest space 171. If the task is not switching to user space, the guest state is restored in the extended state register (block 414). For example, if the task is switching into guest space 171, the guest vector state is restored in the vector register 154. Then, it is ensured that access to the guest state in the extended state register is enabled (block 416). For example, the kernel 174 confirms that a bit is set which enables a VM 170A to access the vector register 154 without the VM 170A having to request access to the vector register 154. Then, the task is handled with access to the extended state register enabled (block 418). For example, the task is handled by the VM 170A without the VM 170A having to request access to the vector register 154 and wait for the access to be enabled, thereby improving the efficiency of handling the task. On the other hand, with respect to block 412, if task is switching to user space, it is ensured that access to the user state in the extended state register is enabled (block 426). For example, if the task is switching into user space 173, a bit is set to enable an application 172A to access the vector register 154 without the application 172A having to request access to the vector register 154. Then, the task is handled with access to the extended state register enabled (block 418). For example, the task is handled by the application 172A without the application 172A having to request access to the vector register and wait for the access to be enabled, thereby improving the efficiency of handling the task.

On the other hand, with respect to block 408, if the guest state was most recently used, the guest state for the task is restored in the extended state register (block 420). For example, the guest vector state stored in the memory 130A overwrites a guest vector state or a user vector state of the different task stored in the vector register 154. Then, it is determined whether the task that is now being handled is switching to guest space (block 422). For example, the kernel 174 determines whether the task will be handled in guest space 171 or user space 173. If the task is switching to guest space, it is ensured that access to the guest state in the extended state register is enabled (block 416). For example, the kernel 174 confirms that a bit is set which enables a VM 170A to access the vector register 154 without the VM 170A having to request access to the vector register 154. Then, the task is handled with access to the extended state register enabled (block 418). For example, the task is handled by the VM 170A without the VM 170A having to request access to the vector register 154 and wait for the access to be enabled, thereby improving the efficiency of handling the task. On the other hand, with respect to block 422, if task is not switching to guest space, the user state is restored in the extended state register (block 424). For example, if the task is switching into user space 173, the user vector state is restored in the vector register 154. Then, it is ensured that access to the user state in the extended state register is enabled (block 426). For example, a bit is set to enable a application 172A to access the vector register 154 without the application 172A having to request access to the vector register 154. Then, the task is handled with access to the extended state register enabled (block 418). For example, the task is handled by the application 172A without the application 172A having to request access to the vector register and wait for the access to be enabled, thereby improving the efficiency of handling the task.

In an example embodiment, the example methods 300 and 400 may both be used by the host operating system 100, or the host operating system may only employ one of the example methods 300 and 400. Optimizing the extended context management for virtual machines as proposed herein takes a new and different technological approach which provides technological advantages not present in previously existing methods and systems. Accordingly, the host computer system 100, including the CPUs 120A-C, virtual machines 170A-B, and the kernel 174 are improved by using the presently disclosed techniques.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention is claimed as follows:

1. A host system comprising:
    a memory including a reserve memory;
    one or more processors, in communication with the memory;
    one or more virtual machines executing on the one or more processors;
    one or more interconnected nodes; and
    a kernel executing on the one or more processors to:
        execute a virtual machine of the one or more virtual machines using a guest space;
        store a guest state in an extended state register based on the execution of the virtual machine, wherein the virtual machine has access to the extended state register located in a node of the one or more interconnected nodes;
        receive an instruction for handling a process outside of the guest space;
        save a copy of the guest state in the reserve memory outside the extended state register;
        determine whether handling the process requires access to the extended state register;
        responsive to determining that handling the process does not require access to the extended state register:
            handle the process using a kernel space without using a user space; and
            after the process is handled by the kernel space, determine whether the guest state is still loaded;
                if the guest state is not still loaded, then the guest state is restored and the process switches to the guest space and continues execution; and
                if the guest state is still loaded, then the process switches to the guest space and continues execution; and
        responsive to determining that handling the process requires access to the extended state register:
            restore a user state, from the reserve memory to the extended state register;
            handle the process using the user space;
            after the process is handled by the user space, store an updated user state in the extended state register;
            save a copy of the updated user state in the reserve memory outside the extended state register;
            after storing the updated user state in the extended state register, determine that the guest space will next require the extended state register;
            restore the guest state to the extended state register, upon switching to the guest space; and
            continue executing the virtual machine using the guest space.

2. The system of claim 1, wherein the kernel includes a hypervisor and a context switch module.

3. The system of claim 1, wherein the kernel includes a kernel-based virtual machine (KVM).

4. The system of claim 1, wherein the extended state register includes a floating point unit register (FPU register).

5. The system of claim 1, wherein the extended state register includes a vector register.

6. The system of claim 1, wherein the extended state register includes an FPU register and a vector register.

7. The system of claim 1, wherein the instruction is a virtual machine exit instruction.

8. The system of claim 1, wherein the instruction is an interrupt.

9. The system of claim 1, wherein the extended state register is not overwritten during the handling of the process using the kernel space.

10. The system of claim 1, wherein the reserve memory includes a first memory location for the guest state and a second different memory location for the updated user state.

11. The system of claim 1, wherein the kernel further executes to:
    track a previous usage of the extended state register by the user state and the guest state over a period of time; and
    after handling the process and storing the updated user state in the extended state register, restore one of the user state and the guest state to the extended state register based on the previous usage of the user state and the guest state prior to a subsequent request by one of the user state and the guest state to access the extended state register.

12. A method comprising:
    executing a virtual machine using a guest space;
    storing a guest state in an extended state register located in a node based on the execution of the virtual machine, wherein the virtual machine has access to the extended state register;
    receiving an instruction for handling a process outside of the guest space;
    saving a copy of the guest state in a reserve memory outside the extended state register;
    determining whether handling the process requires access to the extended state register;
    responsive to determining that handling the process does not require access to the extended state register:
        handling the process using a kernel space without using a user space; and
        after the process is handled by the kernel space, determining whether the guest state is still loaded;
            if the guest state is not still loaded, then restoring the guest state and switching the process to the guest space and continuing execution; and
            if the guest state is still loaded, then switching the process to the guest space and continuing execution; and
    responsive to determining that handling the process requires access to the extended state register:
        restoring a user state, from the reserve memory to the extended state register;
        handling the process using the user space;
        after the process is handled by the user space, storing an updated user state in the extended state register;
        saving a copy of the updated user state in the reserve memory outside the extended state register;
        after storing the updated user state in the extended state register, determining that the guest space will next require the extended state register;
        restoring the guest state to the extended state register, upon switching to the guest space; and
        continuing executing the virtual machine using the guest space.

13. The method of claim 12, wherein the guest state includes a guest floating point unit state.

14. The method of claim 12, wherein the guest state includes a guest vector state.

15. The method of claim 12, wherein the guest state includes guest floating point unit state and a guest vector state.

16. The method of claim 12, wherein the instruction is at least one of a virtual machine exit instruction and an interrupt.

17. The method of claim 12, wherein the extended state register is not overwritten during the handling of the process using the kernel space.

18. The method of claim 12, wherein the reserve memory includes a first memory location for the guest state and a second different memory location for the updated user state.

19. The method of claim 12, further comprising:
tracking a previous usage of the extended state register by the user state and the guest state over a period of time; and
after handling the process and storing the updated user state in the extended state register, restoring one of the user state and the guest state to the extended state register based on the previous usage of the user state and the guest state prior to a subsequent request by one of the user state and the guest state to access the extended state register.

20. A non-transitory computer-readable storage medium storing executable instructions which, when executed by a computer system, cause the computer system to:
execute a virtual machine using a guest space;
store a guest state in an extended state register located in a node based on the execution of the virtual machine, wherein the virtual machine has access to the extended state register;
receive an instruction for handling a process outside of the guest space;
save a copy of the guest state in a reserve memory outside the extended state register;
determine whether handling the process requires access to the extended state register;
responsive to determining that handling the process does not require access to the extended state register:
  handle the process using a kernel space without using a user space; and
  after the process is handled by the kernel space, determine whether the guest state is still loaded;
    if the guest state is not still loaded, then the guest state is restored and the process switches to the guest space and continues execution; and
    if the guest state is still loaded, then the process switches to the guest space and continues execution; and
responsive to determining that handling the process requires access to the extended state register:
  restore a user state, from the reserve memory to the extended state register;
  handle the process using the user space;
  after the process is handled by the user space, store an updated user state in the extended state register;
  save a copy of the updated user state in the reserve memory outside the extended state register;
  after storing the updated user state in the extended state register, determine that the guest space will next require the extended state register;
  restore the guest state to the extended state register, upon switching to the guest space; and
  continue executing the virtual machine using the guest space.

\* \* \* \* \*